Nov. 22, 1960  P. H. DIXON  2,961,019
SUPPORTING STRUCTURE FOR MACHINE TOOLS
Filed April 14, 1958  2 Sheets-Sheet 2
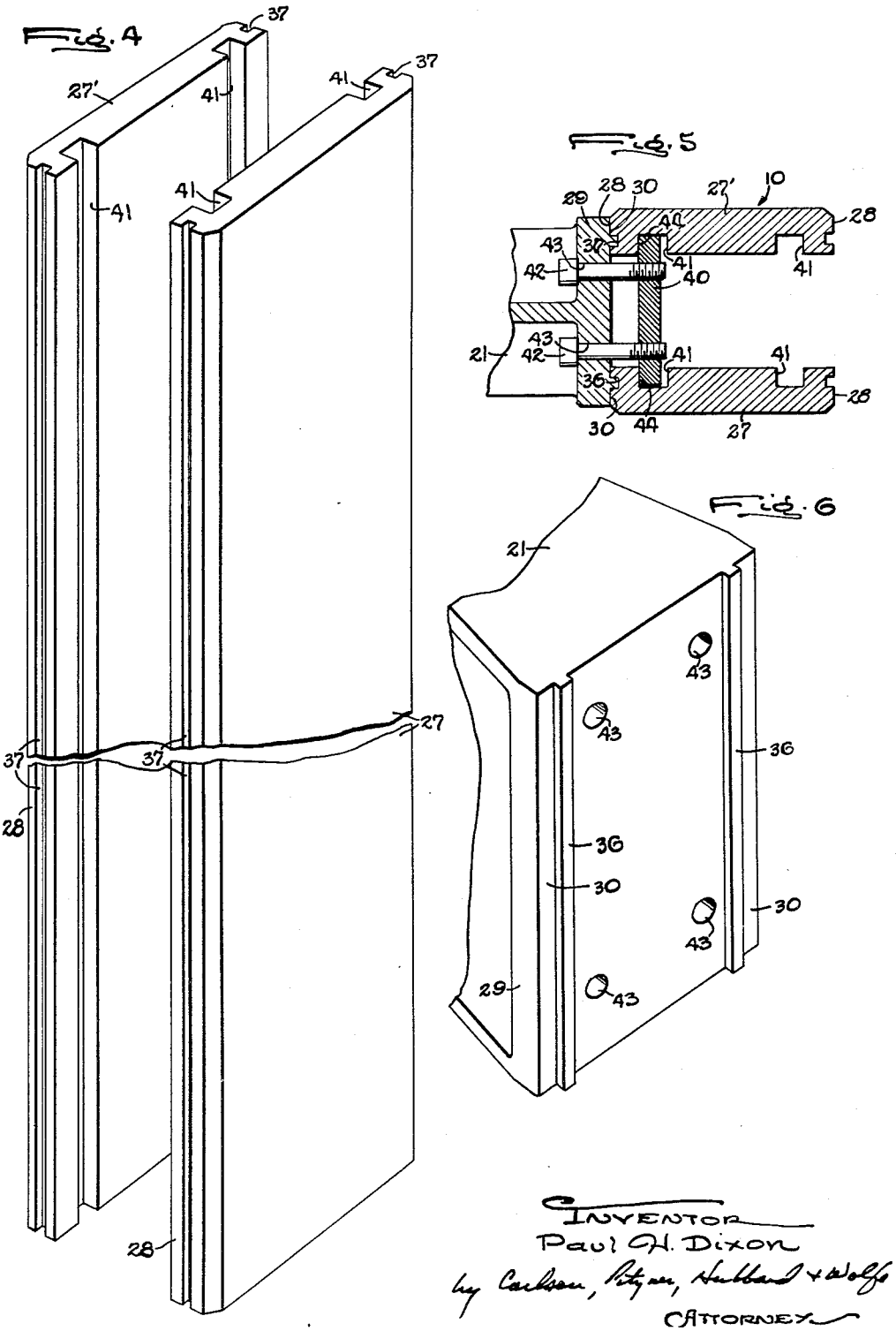
INVENTOR
Paul H. Dixon
by Carlson, Pitzner, Hubbard & Wolfe
ATTORNEY US United States Patent Office 2,961,019
Patented Nov. 22, 1960

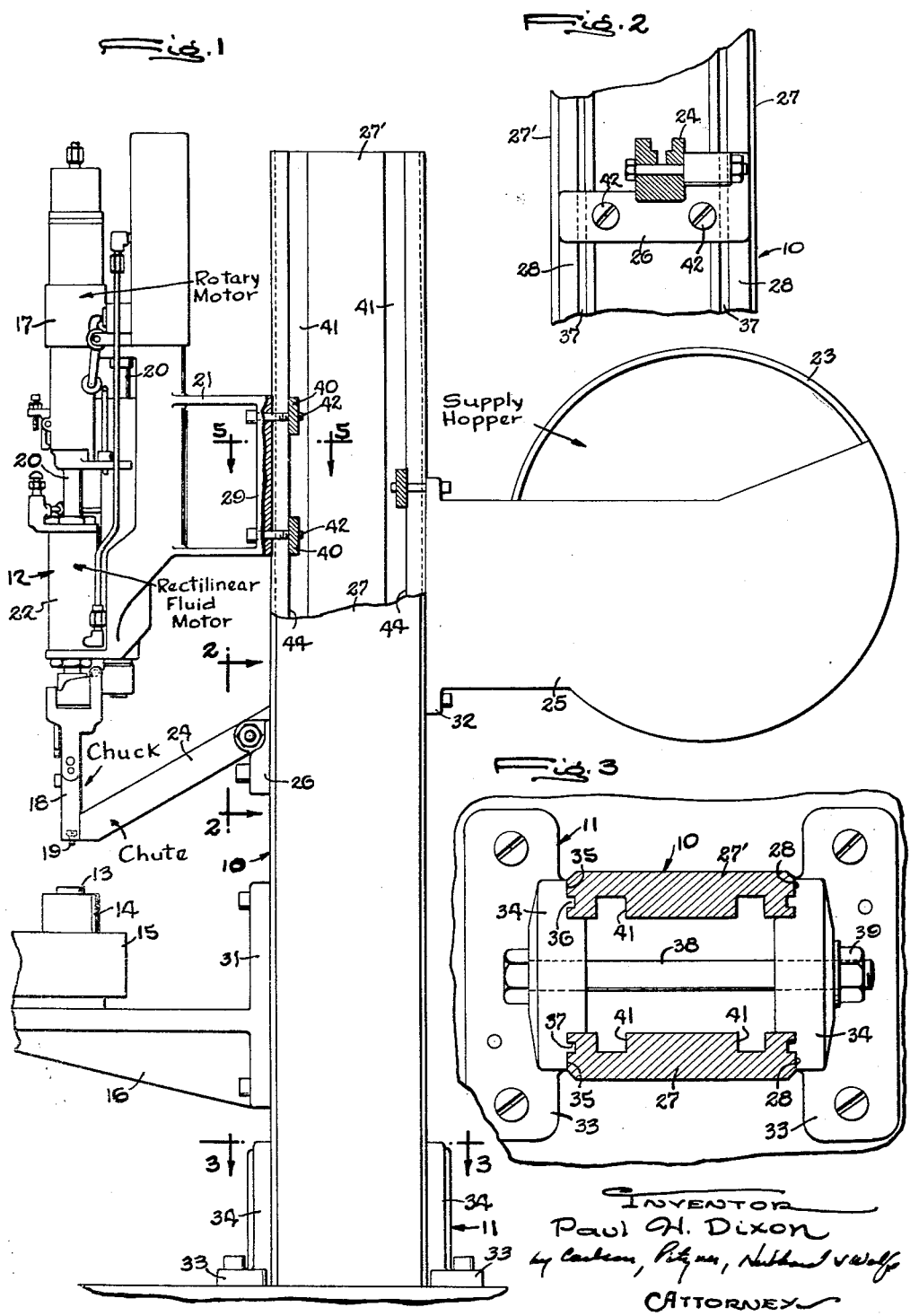

2,961,019

SUPPORTING STRUCTURE FOR MACHINE TOOLS

Paul H. Dixon, % Dixon Automatic Tool, Inc., 2300 23rd Ave., Rockford, Ill.

Filed Apr. 14, 1958, Ser. No. 728,297

3 Claims. (Cl. 144—32)

This invention relates to machine tools in which various parts such as the tool head and the work table are supported on a stationary member which may, for example, be an upright column.

The principal object of the invention is to provide in a machine tool a new and improved stationary member which, as compared to prior arrangements, is of more simple and inexpensive construction and which is more versatile in that standard parts may be adapted to various types of machine tools and in that the parts mounted on the member may easily be adjusted for different operations.

A more detailed object is to achieve the foregoing by forming the primary parts of the supporting member as elongated plates which are parallel to each other and are laterally spaced apart and by clamping the other parts of the machine tool to the edges of the plates in such a way that these parts rigidly connect the plates while, at the same time, the parts are readily adjustable along the plates.

Another object is to provide a rigid assembly of the supporting member by arranging the other parts to span the plates, by connecting these parts to the plate edges through tongues and grooves to maintain the spacing between the plates and by clamping these parts to the plates.

Other objects and advantages of the invention will become apparent from the following detailed description taken in connection with the accompanying drawings, in which Figure 1 is a fragmentary side elevation of a machine tool embodying the novel supporting structure of the present invention, parts being broken away and shown in section.

Fig. 2 is an enlarged fragmentary sectional view taken along the line 2—2 in Fig. 1.

Fig. 3 is an enlarged fragmentary sectional view taken along the line 3—3 in Fig. 1.

Fig. 4 is an enlarged perspective view of the plates of the supporting member.

Fig. 5 is an enlarged fragmentary sectional view taken along the line 5—5 in Fig. 1.

Fig. 6 is an enlarged fragmentary perspective view of one of the parts which is clamped to the plates.

As shown in the drawings for purposes of illustration, the invention is embodied in a machine tool comprising a column 10 upstanding from a base or pedestal 11 and supporting a head 12. The latter operates on a workpiece 13 which is held in a fixture 14 on a work table 15 beneath the head. The table may be of the turret type and be rotatably mounted on a bracket 16 also supported on the side of the column 10.

In the present instance, the machine tool is a power operated automatic screwdriver in which the head 12 comprises a screw driving tool (not shown) supported on the lower end of the shaft of a motor 17 and projecting into a chuck 18 for engagement with a screw 19. The motor, the tool and the chuck are guided by rods 20 for vertical sliding on a bracket 21 secured to the side of the column 10 and are slidable by a fluid motor 22 to lower the screw into engagement with the work and to withdraw the tool. Screws 19 are delivered successively to the chuck 18 from a feeder 23 through a chute 24 under the control of a suitable escapement mechanism (not shown). The frame 25 of the feeder is secured to the side of the column opposite the head 12 and the chute projects through the column to the chuck 18 and is supported by a bar 26 clamped to the other side of the column.

The present invention contemplates the provision of a novel construction of the column 10 which, as compared to prior arrangements, is cheaper and easier to manufacture and which, in addition, is more versatile both in its adaptability to machine tools of different types and in the ease with which it permits modification and adjustment of the parts for various jobs. In general, this is achieved by making the principal components of the column from parts which are standard stock and which require only simple milling operations and by joining these components together and to the other parts of the machine tool, such as the head bracket 21 and the table bracket 16, in such a way that the latter parts form a part of the column and, at the same time, are permitted a wide range of adjustment along the length of the column.

To the foregoing ends, the column principally is composed of two elongated parallel plates 27 and 27' which, in the illustrated form of the invention, are vertically disposed and are laterally spaced apart. The various parts supported by or connected to the column include flat plate-like portions which abut against the edge surfaces 28 of the plates 27 and 27' and are clamped to the latter in such a manner as to form a rigid column. Thus, the bracket 21 for the head 12 includes a plate portion 29 (Fig. 5) with surfaces 30 abutting the edge surfaces 28 while the work table bracket 16 and the feeder 23 are supported on the column plates 27 and 27' through the medium of plate-like parts 31 and 32 respectively as is the chute 24 by the bar 26. Similarly, the pedestal 11 is formed from two castings each of which includes a base portion 33 (Fig. 3) and a flat upright portion 34 formed with surfaces 35 engaging the surfaces 28.

In order that the parts 16, 21, 26, 32 and 34 when clamped to the plates 27 and 27' rigidly connect the latter while maintaining the spacing between these plates, mating tongues 36 and grooves 37 are formed in the edge surfaces 28 and abutting surfaces of the attached parts. Herein, the grooves 37 are milled in the edge surfaces 28 while the tongues 36 are formed on the opposing surfaces such as on the surfaces 30 of the bracket plate portion 29 and the surfaces 35 of pedestal portions 34. The tongues 37 and grooves 36 are formed accurately so that they serve to hold the column plates 27 and 27' in the desired spaced and parallel relation.

Means is provided to clamp the various parts to the upright plates 27 and 27' of the column 10. In the case of the pedestal 11 where there are two opposed plate portions 34, one on each side of the column, this means may comprise a bolt 38 (Fig. 3) spanning and projecting through both of the portions 34. A nut 39 is threaded onto the end of the bolt to draw the surfaces 35 tight against the surfaces 28 and thereby rigidly clamp these parts together.

In the other cases where the mounting plate portion, such as the part 29 of the bracket 21 (Fig. 5), does not oppose a similar part, the clamping means includes one or more auxiliary bars 40 which span the plates 27 and 27' of the column 10 with the ends of each bar projecting into longitudinal slots 41 formed on the inner sides of these plates. There are two such slots in each plate, one adjacent each edge for use in clamping a part to that edge. For the bracket 21, two bars 40 are used, one above the other as shown in Fig. 1, and screws 42 project through holes 43 in the plate portion 29 of the bracket and are threaded into the bars (see Figs. 5 and 6). By tightening the screws, the bars are drawn against the shoulders 44 formed by the slots 41 and thereby clamp the surfaces 30 against the edge surfaces 28 of the plates 27 and 27'. As in the case of the pedestal 11, the surfaces 30 on the bracket 21 are formed with tongues 36 which are received in the grooves 37. The feeder 23, the chute support 26 and the table bracket 16 are attached to the column plates in a similar manner.

It will be observed that a column arrangement constructed in accordance with the present teaching is substantially cheaper and easier to manufacture than columns employed heretofore. Thus, the principal components, the plates 27 and 27' can be made from standard stock which requires only comparatively simple milling of the surfaces 28, the grooves 37 and the slots 41. Moreover, the two plates are identical and the cross section of each is the same regardless of the width of the column 10, that is the spacing between the plates, and the height of the column. For this reason, columns may be essentially prefabricated simply by milling the plates and then cutting two to the desired length.

In addition, the column 10 is appreciably more versatile than prior arrangements. Because the grooves 37 extend the full lengths of the plates 27 and 27', the head 12, the feeder 23, the table 16 and any other similar parts may be located at any desired point along the column. Also, these parts may be adjusted easily after the column has been constructed simply by loosening the screws 42 and sliding the part up or down. During such adjustment, the column remains rigid since the tongues 36 are still in the grooves 37 and maintain the spacing of the plates 27 and 27'.

Another advantage resides in the fact that the column is open from top to bottom. Thus, parts such as the chute 24 may project through at any point without specially constructing that part or making particular provision in the column proper.

I claim as my invention:

1. In a machine tool, the combination of, two elongated plates laterally spaced apart and paralleling each other, a plurality of members spanning said plates and having surfaces engaging the edge surfaces of the plates, mating tongues and grooves formed in each pair of engaging surfaces and extending lengthwise of the plates, a tool head fixed to one of said members, a work supporting table fixed to another of said members, elongated slots formed in the opposed sides of said plates and extending longitudinally of the latter, said slots being spaced an equal distance from the edges of the corresponding plates, a plurality of bars spanning said plates with their ends projecting into said slots and with at least one bar disposed adjacent each of said members, and means operable to draw each bar and the adjacent one of said members together, thereby to clamp said members to said plates and form a rigid assembly for the machine tool.

2. In a machine tool, the combination of, two elongated plates laterally spaced apart and paralleling each other, the edges of said plates having elongated grooves formed therein and extending longitudinally of the plates, a plurality of members each spanning adjacent edges of said plates, tongues formed on said members and projecting into said grooves thereby to maintain the lateral spacing of said plates, a work support fixed to one of said members, a tool support fixed to another one of said members, said members being positionable along said plates to move said tool and work supports relative to each other longitudinally of the plates, abutments formed on opposed sides of said plates and extending longitudinally of the latter, said abutments being spaced an equal distance from the edges of the corresponding plates, a plurality of bars, each spanning said plates with their ends disposed behind one abutment on each plate and with at least one bar disposed adjacent each of said members, and means operable to draw each bar and the adjacent one of said members together, thereby to clamp said members to said plates and form a rigid assembly for the machine tool.

3. In a machine tool, the combination of, two elongated plates laterally spaced apart and paralleling each other, a plurality of members spanning said plates and having surfaces engaging the edge surfaces of the plates, mating tongues and grooves formed in each pair of engaging surfaces and extending lengthwise of the plates, a tool head fixed to one of said members, a work supporting table fixed to another of said members, abutment surfaces formed on opposed sides of said plates and extending longitudinally of the latter, said abutment surfaces being spaced an equal distance from the edges of the corresponding plates, two base members spanning said plates on opposite sides thereof and having surfaces engaging the edge surfaces of the plates, said base members being disposed adjacent the lower ends of said plates and having flat base portions to form a supporting pedestal for the plates, a plurality of bars spanning said plates with their ends disposed behind said abutting surfaces and with at least one bar disposed adjacent each of said members, and means operable to draw each bar and the adjacent one of said members together, thereby to clamp said members to said plates and form a rigid assembly for the machine tool.

References Cited in the file of this patent

FOREIGN PATENTS

| 145,433 | Australia | Feb. 27, 1952 |
| 489,926 | Italy | Jan. 29, 1954 |